(12) United States Patent
Nishimura et al.

(10) Patent No.: US 8,848,196 B2
(45) Date of Patent: Sep. 30, 2014

(54) SPECTROPHOTOMETER HAVING PROMPT SPECTROPHOTOMETRIC MEASUREMENT

(71) Applicant: Seiko Epson Corporation, Tokyo (JP)

(72) Inventors: Teruyuki Nishimura, Matsumoto (JP); Nozomu Hirokubo, Fujimi (JP)

(73) Assignee: Seiko Epson Corporation (JP)

( * ) Notice: Subject to any disclaimer, the term of this patent is extended or adjusted under 35 U.S.C. 154(b) by 21 days.

(21) Appl. No.: 13/650,439

(22) Filed: Oct. 12, 2012

(65) Prior Publication Data

US 2013/0107262 A1    May 2, 2013

(30) Foreign Application Priority Data

Oct. 26, 2011   (JP) ................................. 2011-235357

(51) Int. Cl.
| | |
|---|---|
| *G01B 9/02* | (2006.01) |
| *G02B 26/00* | (2006.01) |
| *G01J 3/26* | (2006.01) |
| *G01J 3/42* | (2006.01) |
| *G01J 3/02* | (2006.01) |
| *G01J 3/32* | (2006.01) |
| *G01J 3/28* | (2006.01) |

(52) U.S. Cl.
CPC ................. *G01J 3/42* (2013.01); *G02B 26/001* (2013.01); *G01J 3/26* (2013.01); *G01J 3/0297* (2013.01); *G01J 3/32* (2013.01); *G01J 3/027* (2013.01); *G01J 2003/2879* (2013.01)
USPC .......................................... 356/454; 356/519

(58) Field of Classification Search
CPC ........... G01B 2290/25; G02B 6/29361; G02B 6/29395; G02B 6/29358–6/2937; G02B 5/28–5/3091; G01J 3/51; G01J 3/46; G01J 2003/1226–2003/1252; G01J 3/027; G01J 3/0297; G01J 3/26; G01J 2003/2879
USPC ................. 356/416, 454, 480, 508, 519, 506; 359/578

See application file for complete search history.

(56) References Cited

U.S. PATENT DOCUMENTS

| | | | | |
|---|---|---|---|---|
| 3,660,761 | A | * | 5/1972 | Harmon et al. ................ 375/231 |
| 6,452,646 | B1 | * | 9/2002 | Sharp et al. ..................... 349/18 |
| 7,106,514 | B2 | * | 9/2006 | Murata et al. .................. 359/578 |

(Continued)

FOREIGN PATENT DOCUMENTS

| | | |
|---|---|---|
| JP | 07-243963 | 9/1995 |
| JP | 2002-071562 | 3/2002 |

(Continued)

*Primary Examiner* — Kara E Geisel
*Assistant Examiner* — Violeta A Prieto
(74) *Attorney, Agent, or Firm* — Harness, Dickey & Pierce, P.L.C.

(57) ABSTRACT

A spectrophotometer includes a fixed substrate having a fixed reflecting film, a movable substrate having a movable reflecting film, a tunable interference filter having a static actuator changing the gap distance of an inter-reflecting film gap between the fixed reflecting film and the movable reflecting film, a detecting section detecting the light intensity of a light extracted by the tunable interference filter, a voltage setting section and a voltage controlling section that apply a continuously-varying analog voltage to the static actuator, a voltage monitoring section monitoring the voltage applied to the static actuator, and a light intensity obtaining section obtaining the light intensity detected by the detecting section when the voltage monitored by the voltage monitoring section becomes a predetermined voltage to be measured.

16 Claims, 9 Drawing Sheets

(56) References Cited

U.S. PATENT DOCUMENTS

| | | | |
|---|---|---|---|
| 7,130,103 | B2 | 10/2006 | Murata |
| 7,190,523 | B2 | 3/2007 | Yoda |
| 7,286,244 | B2 * | 10/2007 | Murata ............... 356/519 |
| 7,940,446 | B2 | 5/2011 | Scott et al. |
| 8,135,286 | B2 | 3/2012 | Ridley et al. |
| 8,462,348 | B2 * | 6/2013 | Shinto et al. ........... 356/454 |
| 8,512,492 | B2 * | 8/2013 | Yamazaki ............... 156/109 |
| 8,512,493 | B2 * | 8/2013 | Yamazaki ............... 156/109 |
| 8,559,111 | B2 * | 10/2013 | Nishimura et al. ...... 359/578 |
| 8,586,929 | B2 * | 11/2013 | Barth ....................... 250/342 |
| 2004/0070768 | A1 * | 4/2004 | McDaniel et al. ....... 356/519 |
| 2005/0007933 | A1 * | 1/2005 | Yoda ..................... 369/112.22 |
| 2005/0111008 | A1 * | 5/2005 | Murata .................... 356/519 |
| 2005/0122191 | A1 | 6/2005 | Nakamura et al. ...... 333/202 |
| 2005/0219680 | A1 * | 10/2005 | Ishikawa ................. 359/291 |
| 2007/0121205 | A1 * | 5/2007 | Miles ....................... 359/428 |
| 2008/0037093 | A1 * | 2/2008 | Miles ....................... 359/237 |
| 2009/0064772 | A1 * | 3/2009 | Wang ......................... 73/105 |
| 2010/0045971 | A1 * | 2/2010 | Brokopp ................... 356/51 |
| 2011/0043891 | A1 * | 2/2011 | Miles ....................... 359/291 |
| 2011/0109909 | A1 * | 5/2011 | Wu ........................... 356/445 |
| 2011/0176128 | A1 * | 7/2011 | Matsuno ..................... 356/72 |
| 2011/0188110 | A1 * | 8/2011 | Miles ....................... 359/291 |
| 2011/0194118 | A1 * | 8/2011 | Hirokubo et al. ....... 356/454 |
| 2011/0205551 | A1 * | 8/2011 | Saito et al. .............. 356/519 |
| 2011/0222157 | A1 * | 9/2011 | Sano ....................... 359/578 |
| 2011/0222158 | A1 * | 9/2011 | Sano ....................... 359/584 |
| 2011/0228397 | A1 * | 9/2011 | Matsushita ............. 359/578 |
| 2012/0019812 | A1 * | 1/2012 | Shinto et al. ........... 356/213 |
| 2012/0019827 | A1 * | 1/2012 | Shinto et al. ........... 356/416 |
| 2012/0044491 | A1 * | 2/2012 | Urushidani et al. .... 356/326 |
| 2012/0050742 | A1 * | 3/2012 | Sano ....................... 356/416 |
| 2012/0086945 | A1 * | 4/2012 | Hirokubo et al. ....... 356/450 |
| 2012/0109584 | A1 * | 5/2012 | Urushidani .............. 702/189 |
| 2012/0120402 | A1 * | 5/2012 | Hirokubo et al. ....... 356/450 |
| 2012/0188552 | A1 * | 7/2012 | Hirokubo ................. 356/451 |
| 2012/0257205 | A1 * | 10/2012 | Hirokubo ................. 356/450 |
| 2013/0070247 | A1 * | 3/2013 | Funamoto ............... 356/416 |
| 2013/0114083 | A1 * | 5/2013 | Sano ....................... 356/416 |
| 2013/0279005 | A1 * | 10/2013 | Sano ....................... 359/578 |

FOREIGN PATENT DOCUMENTS

| | | |
|---|---|---|
| JP | 2002-277640 | 9/2002 |
| JP | 2002-277758 | 9/2002 |
| JP | 2005-031115 | 2/2005 |
| JP | 2005-250376 | 9/2005 |
| JP | 2005-305614 | 11/2005 |
| JP | 2006-220623 | 8/2006 |
| JP | 2009-512890 | 3/2009 |
| JP | 2009-512891 | 3/2009 |
| JP | 2011-106936 | 6/2011 |

* cited by examiner

SPECTROPHOTOMETER HAVING PROMPT SPECTROPHOTOMETRIC MEASUREMENT

BACKGROUND

1. Technical Field

The present invention relates to spectrophotometers.

2. Related Art

In the past, a tunable interference filter having a pair of reflecting coatings facing each other and extracting a light of a predetermined wavelength from a light to be measured by changing the distance between the reflecting coatings has been known. Moreover, a spectrophotometer measuring the spectrum of a light to be measured by using such a tunable interference filter has been known (see, for example, JP-A-7-243963 (Patent Document 1)).

The optical resonator (the tunable interference filter) described in Patent Document 1 includes a first substrate having a recessed portion formed on the surface thereof and a second substrate, the second substrate being bonded to the first substrate in such a way as to close the inside of the recessed portion of the first substrate. Moreover, high reflecting coatings facing each other and electrodes adjusting the gap (the inter-reflecting coating gap) between the reflecting coatings are provided on the bottom of the recessed portion of the first substrate and the face of the second substrate facing the recessed portion. In addition, on the second substrate, a thick portion and a thin portion are provided in a region facing the recessed portion, and the thick portion can move toward or away from the recessed portion as a result of bending of the thin portion.

In such a tunable interference filter, it is possible to deform the thin portion of a diaphragm by applying a voltage between the electrodes, and it is possible to adjust the inter-reflecting coating gap by moving the thick portion toward or away from a glass substrate.

Incidentally, when a light of a target wavelength is extracted by the tunable interference filter described above, a voltage according to the target wavelength is applied between the electrodes. At this time, since the electrostatic attraction associated with the application of a voltage and an elastic force of the thin portion of the second substrate act on the thick portion of the second substrate, the thick portion vibrates.

Therefore, in the past, to measure a light of a target wavelength with high accuracy, the spectrophotometer using such a tunable interference filter has waited until the thick portion stops vibrating and performed light amount measurement after the thick portion stops vibrating. This increases the time required to perform measurement.

In particular, in the spectrophotometer, it is necessary to measure the amount of light at each wavelength by sequentially changing a wavelength to be measured in a predetermined wavelength range. As a result, when the above-described waiting time is provided for each of all the objects to be measured, the time required to perform measurement is further increased.

SUMMARY

An advantage of some aspects of the invention is to provide a spectrophotometer that can perform prompt spectrophotometric measurement.

A spectrophotometer according to an aspect of the invention includes: a first substrate; a second substrate facing the first substrate; a first reflecting coating provided on the first substrate; a second reflecting coating provided on the second substrate and facing the first reflecting coating with a predetermined inter-reflecting coating gap left between the second reflecting coating and the first reflecting coating; a gap distance changing section changing the gap distance of the inter-reflecting coating gap by bending the second substrate by application of a voltage; a detecting section detecting the light intensity of a light extracted after passing through the first reflecting coating and the second reflecting coating; a filter driving section applying a continuously-varying analog voltage to the gap distance changing section; a voltage monitoring section monitoring the voltage applied to the gap distance changing section; and a light intensity obtaining section obtaining the light intensity detected by the detecting section when the voltage monitored by the voltage monitoring section becomes a predetermined voltage to be measured.

According to the aspect of the invention, the spectrophotometer includes the gap distance changing section changing the gap distance of the inter-reflecting coating gap between the first reflecting coating and the second reflecting coating, and the gap distance changing section bends the second substrate toward the first substrate by application of a voltage and changes the gap distance of the inter-reflecting coating gap.

Here, when a predetermined step voltage is applied to the gap distance changing section to set the gap distance of the inter-reflecting coating gap at an intended value, a driving force from the gap distance changing section and an elastic force (a spring force) of the second substrate itself act on the second substrate. As a result, the second substrate vibrates, making it necessary to wait until the inter-reflecting coating gap stops changing. On the other hand, in the aspect of the invention, the filter driving section applies a continuously-varying analog voltage to the gap distance changing section. As a result, the gap distance of the inter-reflecting coating gap continuously changes in accordance with the magnitude of the analog voltage.

Therefore, the light intensity obtaining section can obtain the light intensity of a light of a predetermined target wavelength by obtaining the light intensity detected by the detecting section when the voltage applied to the gap distance changing section and monitored by the voltage monitoring section, becomes a voltage to be measured which corresponds to a predetermined wavelength to be measured. In this case, since there is no need to wait until the second substrate stops vibrating, it is possible to detect promptly a light intensity at a wavelength to be measured and perform prompt measurement of the spectrum of a light to be measured.

In the spectrophotometer according to the aspect of the invention, it is preferable that the filter driving section applies, to the gap distance changing section, a periodical drive voltage periodically driving the second substrate to move toward or away from the first substrate as the analog voltage. According to this configuration, as the analog voltage, a periodical drive voltage periodically driving the second substrate to move toward or away from the first substrate is applied. Incidentally, the periodical drive voltage is an alternating voltage, for example.

In this case, even when the driving speed of the second substrate is high, it is necessary simply to detect the amount of light at a voltage to be measured at any time point while the second substrate is being driven to move toward or away from the first substrate.

For example, when the amounts of light are detected at a plurality of wavelengths to be measured between a state in which the second substrate does not bend to a state in which the second substrate undergoes maximum displacement to the first substrate, it is necessary to obtain the light intensities at a plurality of voltages to be measured in a short period of time by using a light amount obtaining unit. In this case, when, for example, the analog voltage applied to the gap distance changing section changes greatly, the time interval during which measurement is performed is reduced, which sometimes makes it difficult to obtain a light intensity at a voltage to be measured.

On the other hand, in the configuration described above, as a result of the periodical drive voltage being applied to the gap distance changing section, the second substrate is periodically driven to move toward or away from the first substrate. Therefore, when, for example, the gap distance of the inter-reflecting coating gap with respect to time periodically changes sinusoidally, even when light intensities at all the voltages to be measured cannot be obtained in the first one-quarter of a cycle, it is possible to obtain light intensities at the voltages to be measured in the next one-quarter of a cycle or in a later drive period. This makes it possible to perform accurate measurement of the spectrum of a light to be measured.

In the spectrophotometer according to the aspect of the invention, it is preferable that the period of the periodical drive voltage is longer than the natural period of the second substrate.

According to this configuration, the period of the periodical drive voltage is set at a period longer than the natural period of the second substrate. Here, the natural period of the second substrate is the period of vibration generated by the electrostatic attraction which acts on the second substrate and the elastic force (the spring force) of the second substrate when a specific step voltage is applied to the second substrate. When the period of the periodical drive voltage is shorter than such a natural period, the driving of the second substrate sometimes becomes unstable due to the influence of vibration in the natural period when the second substrate is driven to move toward or away from the first substrate by application of the periodical drive voltage, and the accuracy of measurement may be reduced. On the other hand, when the period of the periodical drive voltage is longer than the natural period of the second substrate, vibration in the natural period of the second substrate is not excited, which makes it possible to drive the second substrate periodically with stability. That is, it is possible to improve the accuracy of measurement of light intensity without an effect of vibration excited by the natural period of the second substrate.

In the spectrophotometer according to the aspect of the invention, it is preferable that the light intensity obtaining section obtains a light intensity at a voltage to be measured more than once and uses the average value of the plurality of light intensities thus obtained as a measurement value.

As described earlier, by driving the second substrate periodically, it is possible to obtain a light intensity at a voltage to be measured more than once. In the configuration described above, since the average value of the measured light intensities at a voltage to be measured is obtained, it is possible to obtain a more accurate measurement value at a voltage to be measured and improve the accuracy of measurement in the spectrophotometer.

In the spectrophotometer according to the aspect of the invention, it is preferable that the filter driving section changes the gap distance of the inter-reflecting coating gap from an initial gap distance at which the second substrate does not bend to a predetermined minimum gap distance, and the minimum gap distance be smaller than a lower limit gap distance corresponding to a minimum wavelength in a wavelength range to be measured.

According to this configuration, in measurement by the spectrophotometer, the filter driving section changes the inter-reflecting coating gap to a minimum gap distance that is smaller than a lower limit gap distance corresponding to a minimum wavelength in a wavelength range to be measured. That is, the filter driving section drives the second substrate in such a way that the second substrate displaces in a gap range provided with a certain margin, the gap range for a wavelength range to be measured.

As a result, even when the amount of displacement of the second substrate driven by the filter driving section changes due to the measurement environment, for example, it is possible to cover a wavelength range to be measured and perform accurate measurement of spectrum.

In the spectrophotometer according to the aspect of the invention, it is preferable that the spectrophotometer includes a storing section storing V-λ data indicating the wavelength of a light extracted by the first reflecting coating and the second reflecting coating, the wavelength of the light corresponding to the voltage applied to the gap distance changing section, and the light intensity obtaining section obtains the voltage to be measured at the wavelength to be measured based on the V-λ data and obtain the light intensity detected by the detecting section when the voltage monitored by the voltage monitoring section becomes the voltage to be measured.

According to this configuration, the V-λ data is stored in the storing section of the spectrophotometer, and the light intensity obtaining section obtains, based on the V-λ data, the light intensity detected by the detecting section when a voltage to be measured which corresponds to a wavelength to be measured is applied to the gap distance changing section. Incidentally, as the V-λ data, for example, data that was measured in advance at the time of production of the spectrophotometer may be used, or the V-λ data may be obtained by calibration which is performed before the start of spectrophotometric measurement performed by the spectrophotometer. In the configuration described above, since a light intensity at a voltage to be measured which corresponds to a target wavelength is obtained based on the V-λ data which is stored in the storing section in advance, it is possible to simplify the processing and perform more prompt spectrophotometric measurement.

In the spectrophotometer according to the aspect of the invention, it is preferable that the spectrophotometer includes a gap distance detecting section measuring the gap distance of the inter-reflecting coating gap and a voltage obtaining section obtaining, as the voltage to be measured, a voltage observed when the gap distance detected by the gap distance detecting section becomes a gap distance to be measured which corresponds to a wavelength to be measured. According to this configuration, the spectrophotometer includes the gap distance detecting section detecting the gap distance of the inter-reflecting coating gap. In addition, the voltage obtaining section obtains a voltage to be measured for a gap distance corresponding to a wavelength to be measured, based on the gap distance detected by the gap distance detecting section and the voltage monitored by the voltage monitoring section. In this case, even when the measurement environment or the like changes, it is possible to obtain accurately a voltage to be measured for extracting a light of a wavelength to be measured, and perform prompt and accurate spectrophotometric measurement.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment according to the invention will be described based on the drawings.
Configuration of a Spectrophotometer
FIG. 1 is a block diagram showing a schematic configuration of a spectrophotometer according to the embodiment of the invention.

A spectrophotometer 1 is an apparatus that measures the spectrum of a light to be measured by analyzing the light intensity of the light to be measured at each wavelength, the light reflected from an object X to be measured, for example. Incidentally, in this embodiment, an example in which a light to be measured, reflected from the object X to be measured, is measured is described. When a light emitter such as a liquid crystal panel is used as the object X to be measured, the light emitted from the light emitter may be used as the light to be measured.

Figure 1:
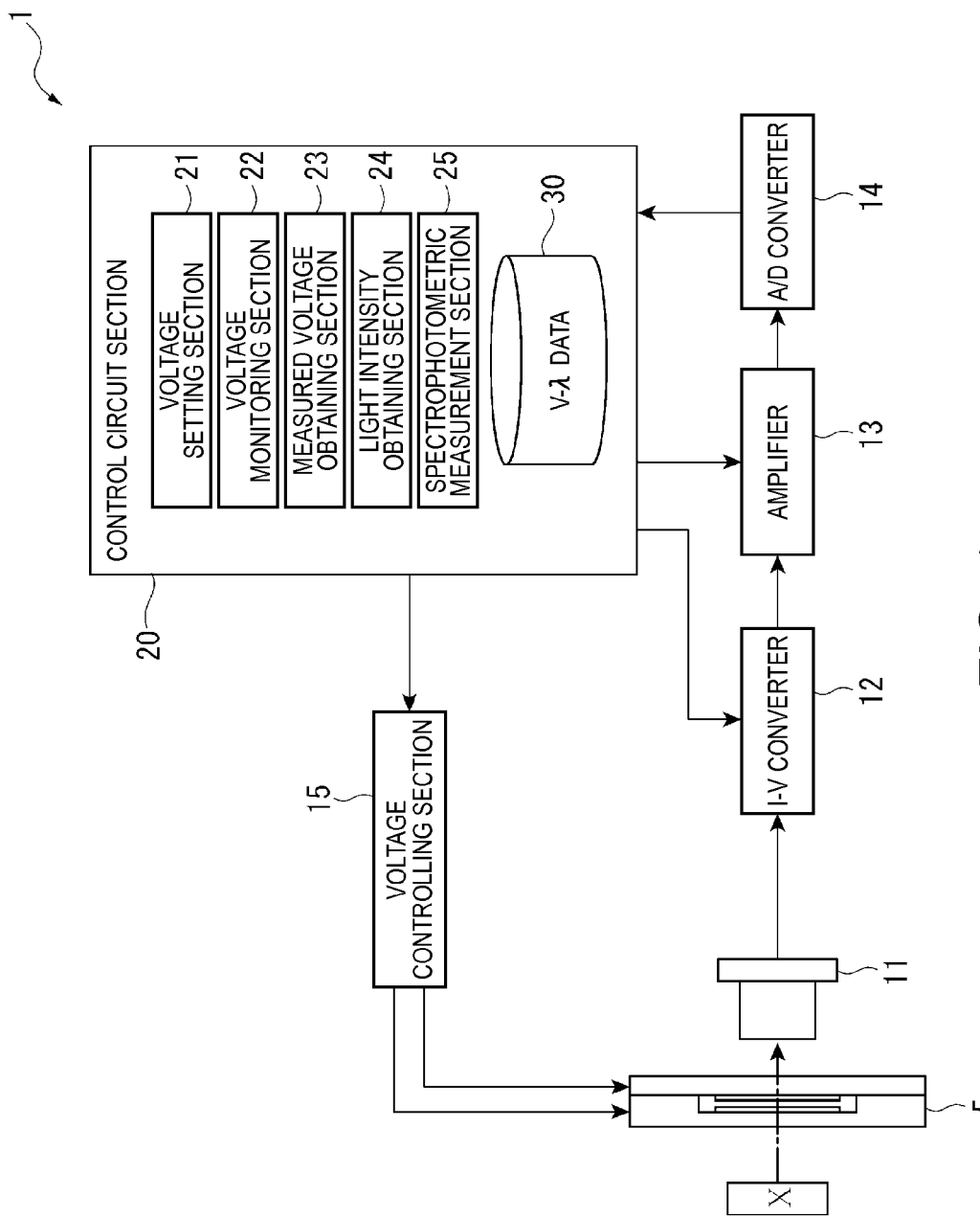
FIG. 1 is a block diagram showing a schematic configuration of a spectrophotometer of a first embodiment according to the invention.

As shown in FIG. 1, the spectrophotometer 1 includes a tunable interference filter 5, a detecting section 11, an I-V converter 12, an amplifier 13, an A/D converter 14, a voltage controlling section 15, and a control circuit section 20.

The detecting section 11 receives a light that has passed through the tunable interference filter 5 and outputs a detected signal (a current) according to the light intensity (the amount) of the received light.

The I-V converter 12 converts the detected signal input from the detecting section 11 into a voltage value and outputs the voltage value to the amplifier 13.

The amplifier 13 amplifies a voltage (a detected voltage) according to the detected signal input from the I-V converter 12.

The A/D converter 14 converts the detected voltage (the analog signal) input from the amplifier 13 into a digital signal and outputs the digital signal to the control circuit section 20.

Figure 2:
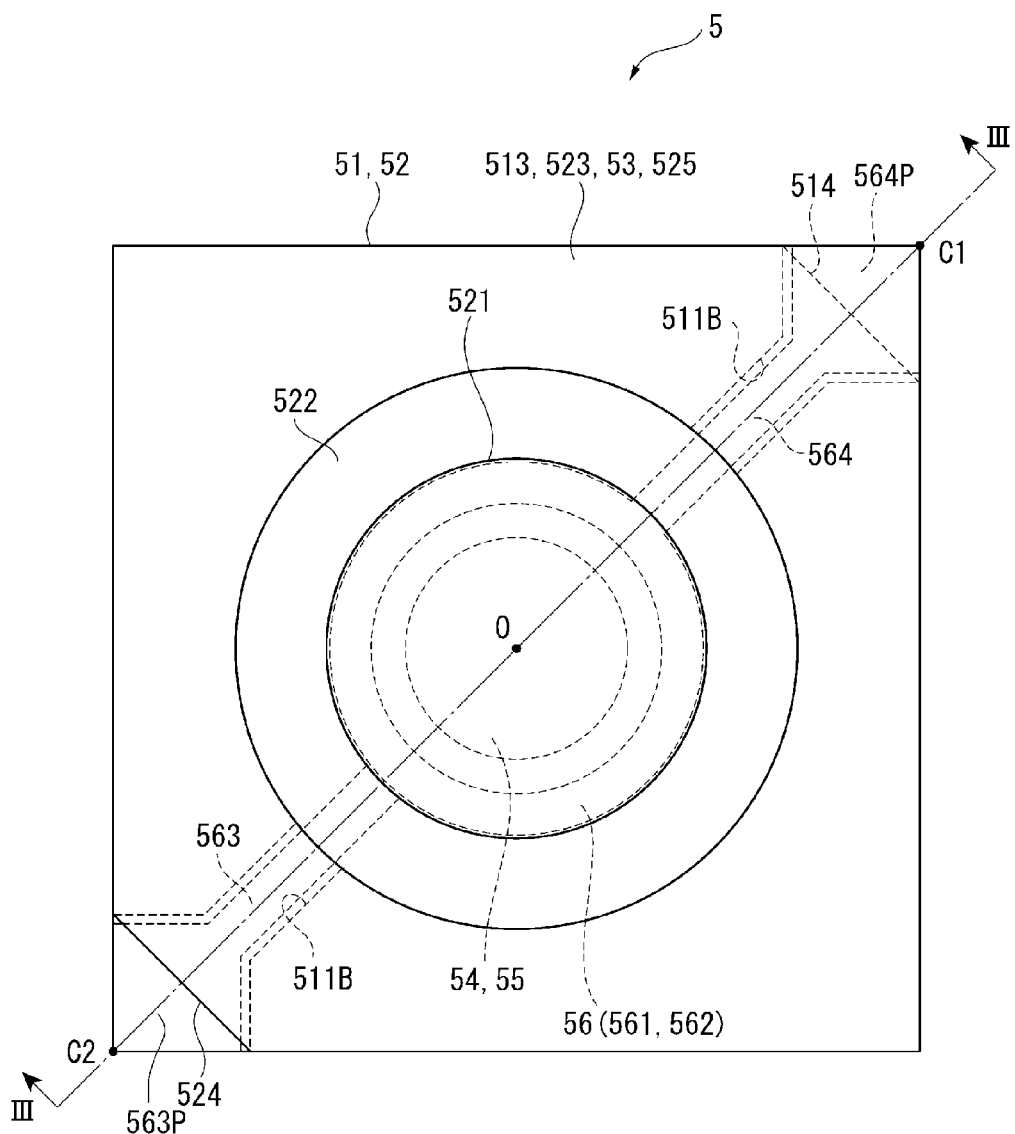
FIG. 2 is a plan view showing a schematic configuration of a tunable interference filter of the first embodiment.
Figure 3:
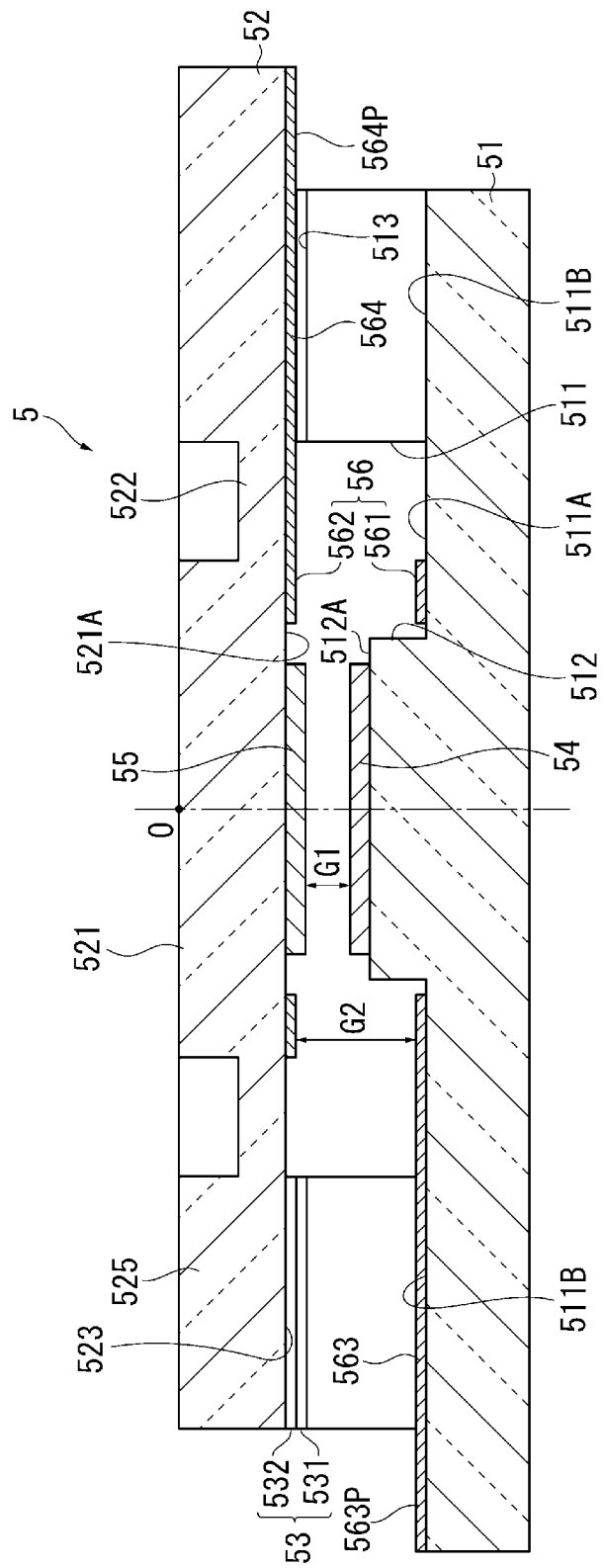
FIG. 3 is a sectional view showing a schematic configuration of the tunable interference filter of the first embodiment.

The voltage controlling section 15 applies a voltage to a static actuator 56, which will be described later, of the tunable interference filter 5 based on the control of the control circuit section 20.
Configuration of the Tunable Interference Filter
Here, the tunable interference filter 5 which is incorporated into the spectrophotometer 1 will be described. FIG. 2 is a plan view showing a schematic configuration of the tunable interference filter 5. FIG. 3 is a sectional view taken on the line of FIG. 2.

As shown in FIG. 2, the tunable interference filter 5 is an optical element that is shaped like a rectangular plate, for example. The tunable interference filter 5 includes, as shown in FIG. 3, a fixed substrate 51 and a movable substrate 52. The fixed substrate 51 and the movable substrate 52 are each formed of, for example, various types of glass such as soda-lime glass, crystalline glass, quartz glass, lead glass, potassium glass, borosilicate glass, and no alkali glass, quartz crystal, or the like. In addition, the fixed substrate 51 and the movable substrate 52 are integrally formed as a result of a first bonding section 513 of the fixed substrate 51 and a second bonding section 523 of the movable substrate 52 being bonded by a bonding film 53 (a first bonding film 531 and a second bonding film 532) formed of a plasma-polymerized film etc. containing siloxane, for example, as the major ingredient. On the fixed substrate 51, a fixed reflecting coating 54 forming a first reflecting coating according to the invention is provided, and, on the movable substrate 52, a movable reflecting coating 55 forming a second reflecting coating according to the invention is provided. The fixed reflecting coating 54 and the movable reflecting coating 55 are disposed in such a way as to face each other with an inter-reflecting coating gap G1 (a gap according to the invention) left between the fixed reflecting coating 54 and the movable reflecting coating 55. In addition, in the tunable interference filter 5, the static actuator 56 used to adjust (change) the gap distance of the inter-reflecting coating gap G1 is provided. The static actuator 56 corresponds to a gap distance changing section according to the invention. The static actuator 56 is formed of a fixed electrode 561 provided on the fixed substrate 51 and a movable electrode 562 provided on the movable substrate 52. The fixed electrode 561 and the movable electrode 562 face each other with an inter-electrode gap G2 left between the fixed electrode 561 and the movable electrode 562. Here, the electrodes 561 and 562 may be directly provided on the surfaces of the fixed substrate 51 and the movable substrate 52, respectively, or may be provided thereon with another film member sandwiched between the electrodes 561 and 562 and the fixed substrate 51 and the movable substrate 52, respectively. Here, the gap distance of the inter-electrode gap G2 is greater than the gap distance of the inter-reflecting coating gap G1.

Moreover, in a filter planar view shown in FIG. 2 in which the tunable interference filter 5 is viewed from a substrate thickness direction of the fixed substrate 51 (the movable substrate 52), a plane center point O of the fixed substrate 51 and the movable substrate 52 coincides with a center point of the fixed reflecting coating 54 and the movable reflecting coating 55 and with a center point of a movable section 521 which will be described later.

Incidentally, in the following description, a planar view in which the tunable interference filter 5 is viewed from a substrate thickness direction of the fixed substrate 51 and the movable substrate 52, that is, a planar view in which the tunable interference filter 5 is viewed from a direction in which the fixed substrate 51, the bonding film 53, and the movable substrate 52 are stacked is referred to as a filter planar view.

Configuration of the Fixed Substrate

In the fixed substrate 51, an electrode placement groove 511 and a reflecting coating providing section 512 are formed by etching. The fixed substrate 51 is formed in such a way as to have a greater thickness than the movable substrate 52 and does not bend by the electrostatic attraction generated when a voltage is applied between the fixed electrode 561 or the movable electrode 562 and an internal stress of the fixed electrode 561.

Moreover, at a vertex C1 of the fixed substrate 51, a notch section 514 is formed, and a movable electrode pad 564P, which will be described later, is exposed on a side where the fixed substrate 51 of the tunable interference filter 5 is located. The electrode placement groove 511 is formed to have the shape of a ring whose center coincides with the plane center point O of the fixed substrate 51 in the filter planar view. In the planar view, the reflecting coating providing section 512 is formed to jut from the center of the electrode placement groove 511 toward the movable substrate 52. A groove bottom face of the electrode placement groove 511 serves as an electrode placement surface 511A on which the fixed electrode 561 is to be placed. Moreover, a projecting top face of the reflecting coating providing section 512 serves as a reflecting coating providing surface 512A.

Furthermore, in the fixed substrate 51, an electrode pullout groove 511B extending from the electrode placement groove 511 to the vertices C1 and C2 on the outer periphery of the fixed substrate 51 is provided.

On the electrode placement surface 511A of the electrode placement groove 511, the fixed electrode 561 is provided. More specifically, the fixed electrode 561 is provided in a region of the electrode placement surface 511A, the region facing the movable electrode 562 of the movable section 521 which will be described later. Moreover, on the fixed electrode 561, an insulating film for ensuring insulation between the fixed electrode 561 and the movable electrode 562 may be stacked.

In addition, on the fixed substrate 51, a fixed pullout electrode 563 extending from the outer periphery of the fixed electrode 561 in the direction of the vertex C2 is provided. An extension end section (a portion located at the vertex C2 of the fixed substrate 51) of the fixed pullout electrode 563 forms a fixed electrode pad 563P connected to the voltage controlling section 15.

Incidentally, in this embodiment, a configuration in which one fixed electrode 561 is provided on the electrode placement surface 511A is described. Instead, for example, a configuration (a double electrode configuration) in which two electrodes which are concentric circles whose center coincides with the plane center point O are provided may be adopted. As described earlier, the reflecting coating providing section 512 is formed on the same axis as the electrode placement groove 511 to have a virtually cylindrical shape whose diameter is smaller than the diameter of the electrode placement groove 511 and is provided with the reflecting coating providing surface 512A facing the movable substrate 52.

As shown in FIG. 3, on the reflecting coating providing section 512, the fixed reflecting coating 54 is provided. As the fixed reflecting coating 54, for example, a film of metal such as Ag or a film of an alloy such as an Ag alloy can be used. Moreover, a dielectric multilayer film containing $TiO_2$ as a high refractive layer and $SiO_2$ as a low refractive layer, for example, may be used. Furthermore, a reflecting coating in which a metal film (or an alloy film) is stacked on a dielectric multilayer film, a reflecting coating in which a dielectric multilayer film is stacked on a metal film (or an alloy film), or a reflecting coating in which a single-layer refractive layer ($TiO_2$, $SiO_2$, or the like) and a metal film (or an alloy film) are stacked may be used.

Moreover, on a light entrance face (a face on which the fixed reflecting coating 54 is not provided) of the fixed substrate 51, an anti-reflection coating may be formed in a position corresponding to the fixed reflecting coating 54. The anti-reflection coating can be formed by alternately stacking a low refractive index film and a high refractive index film. The anti-reflection coating reduces the reflectivity of a visible light on the surface of the fixed substrate 51 and increases the transmittance.

In addition, of a face of the fixed substrate 51 facing the movable substrate 52, a face on which the electrode placement groove 511, the reflecting coating providing section 512, and the electrode pullout groove 511B are not formed by etching forms the first bonding section 513. In the first bonding section 513, the first bonding film 531 is provided, and, as a result of the first bonding film 531 being bonded to the second bonding film 532 provided on the movable substrate 52, as described earlier, the fixed substrate 51 and the movable substrate 52 are bonded.

Configuration of the Movable Substrate

In the filter planar view shown in FIG. 2, the movable substrate 52 includes the circular movable section 521 whose center is the plane center point O, a holding section 522 which is on the same axis as the movable section 521 and holds the movable section 521, and a substrate periphery 525 provided on the outside of the holding section 522.

Moreover, as shown in FIG. 2, in the movable substrate 52, a notch section 524 is formed in a position corresponding to the vertex C2, and the fixed electrode pad 563P is exposed when the tunable interference filter 5 is viewed from the side where the movable substrate 52 is located.

The movable section 521 is formed to have a greater thickness than the holding section 522. For example, in this embodiment, the movable section 521 is formed to have the same thickness as the movable substrate 52. In the filter planar view, the movable section 521 is formed to have a diameter that is at least greater than the diameter of the outer periphery of the reflecting coating providing surface 512A. In addition, in the movable section 521, the movable electrode 562 and the movable reflecting coating 55 are provided.

Incidentally, as is the case with the fixed substrate 51, on a face of the movable section 521 opposite to the fixed substrate 51, an anti-reflection coating may be formed. Such an anti-reflection coating can be formed by alternately stacking a low refractive index film and a high refractive index film. The anti-reflection coating reduces the reflectivity of a visible light on the surface of the movable substrate 52 and increases the transmittance.

The movable electrode 562 faces the fixed electrode 561 with the inter-electrode gap G2 left between the movable electrode 562 and the fixed electrode 561 and is formed to have the shape of a ring which is the same shape as the fixed electrode 561. Moreover, the movable substrate 52 has a movable pullout electrode 564 extending from the outer periphery of the movable electrode 562 to the vertex C1 of the movable substrate 52. An extension end section (a portion located at the vertex C1 of the movable substrate 52) of the movable pullout electrode 564 forms a movable electrode pad 564P connected to the voltage controlling section 15.

The movable reflecting coating 55 is provided in a central part of the movable surface 521A of the movable section 521 in such a way as to face the fixed reflecting coating 54 with the inter-reflecting coating gap G1 left between the movable reflecting coating 55 and the fixed reflecting coating 54. As the movable reflecting coating 55, a reflecting coating having the same configuration as the fixed reflecting coating 54 described above is used.

Incidentally, in this embodiment, as described earlier, an example in which the gap distance of the inter-electrode gap G2 is greater than the gap distance of the inter-reflecting coating gap G1 is described. However, the embodiment is not limited to this example. Depending on the wavelength range of the light to be measured, for example, when infrared radiation or far infrared radiation is used as the light to be measured, a configuration in which the gap distance of the inter-reflecting coating gap G1 is greater than the gap distance of the inter-electrode gap G2 may be adopted.

The holding section 522 is a diaphragm surrounding the movable section 521 and is formed to have a thickness smaller than the thickness of the movable section 521. Such a holding section 522 bends more easily than the movable section 521, which makes it possible to displace the movable section 521 toward the fixed substrate 51 with slight electrostatic attraction. At this time, since the movable section 521 has a greater thickness than the holding section 522 and the stiffness of the movable section 521 is increased, the shape of the movable section 521 is not changed even when the holding section 522 is pulled toward the fixed substrate 51 by the electrostatic attraction. Therefore, the movable reflecting coating 55 provided in the movable section 521 does not bend, making it possible to maintain a state in which the fixed reflecting coating 54 and the movable reflecting coating 55 are parallel at all times. Incidentally, in this embodiment, the holding section 522 in the form of a diaphragm is described as an example, but the embodiment is not limited thereto. For example, a configuration in which beam-like holding sections which are equiangularly disposed with the plane center point O located at the center thereof are provided may be adopted.

As described earlier, the substrate outer periphery 525 is provided on the outside of the holding section 522 in the filter planar view. A face of the substrate outer periphery 525 facing the fixed substrate 51, has the second bonding section 523 facing the first bonding section 513. In addition, in the second bonding section 523, the second bonding film 532 is provided, and, as described earlier, as a result of the second bonding film 532 being bonded to the first bonding film 531, the fixed substrate 51 and the movable substrate 52 are bonded. In the tunable interference filter 5 described above, the fixed electrode pad 563P and the movable electrode pad 564P are connected to the voltage controlling section 15. Therefore, as a result of a voltage being applied between the fixed electrode 561 and the movable electrode 562 by the voltage controlling section 15, the movable section 521 is displaced to the fixed substrate 51 by the electrostatic attraction. This makes it possible to change the gap distance of the inter-reflecting coating gap G1 to a predetermined gap distance.

Configuration of the Control Circuit Section

Back in FIG. 1, the control circuit section 20 of the spectrophotometer 1 will be described.

The control circuit section 20 is formed as a combination of a CPU, a memory, and the like, for example, and controls the entire operation of the spectrophotometer 1. As shown in FIG. 1, the control circuit section 20 includes a voltage setting section 21, a voltage monitoring section 22, a measured voltage obtaining section 23, a light intensity obtaining section 24, and a spectrophotometric measurement section 25.

Moreover, the control circuit section 20 includes a storing section 30. In the storing section 30, V-λ data is stored. The V-λ data is data indicating the relationship between a voltage which is applied to the static actuator 56 of the tunable interference filter 5 and the wavelength of a light which is extracted by the tunable interference filter 5. The V-λ data is generated by, for example, measuring a transmission wavelength for a voltage in advance at the time of production of the tunable interference filter 5 and is stored in the storing section 30.

The voltage setting section 21, together with the voltage controlling section 15, forms a filter driving section according to the invention. In spectrophotometric measurement performed by the spectrophotometer 1, the voltage setting section 21 applies, to the static actuator 56, a periodical drive voltage (an alternating voltage) which is a continuously-varying analog voltage by controlling the voltage controlling section 15.

Here, the voltage setting section 21 applies, as the periodical drive voltage, a periodical drive voltage having a longer period than a natural period in natural vibration of the movable section 521 in the movable substrate 52. The natural period of the movable section 521 is about 100 μs, though it varies depending on the elastic force (the spring force) of the holding section 522 or the measurement environment (for example, air pressure). Therefore, the voltage setting section 21 simply has to set a periodical drive voltage having a period of about 2 ms, for example.

Figure 4:
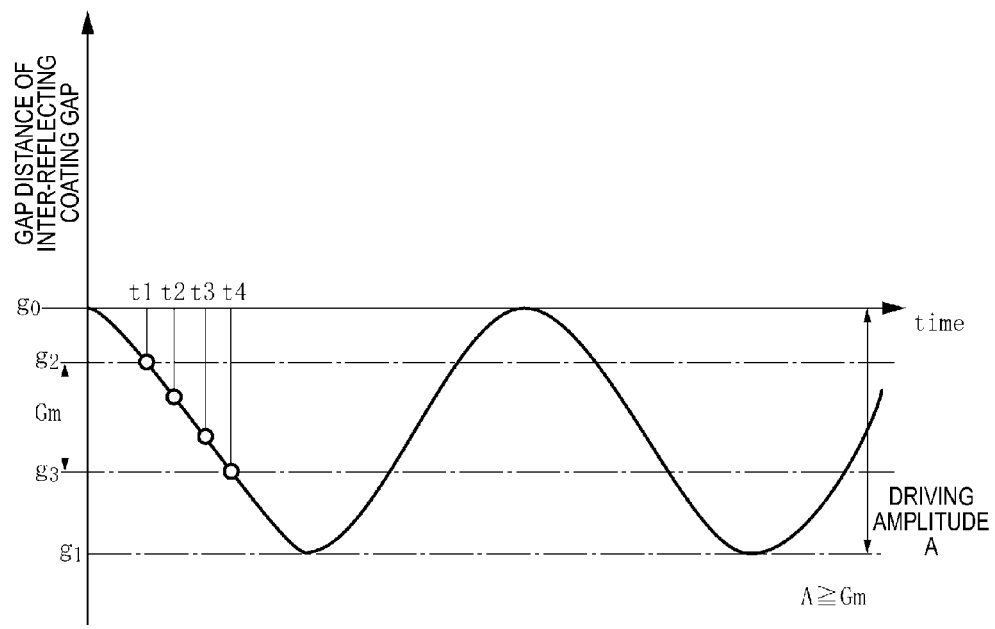
FIG. 4 is a diagram showing the relationship between the time and the gap distance of an inter-reflecting coating gap when a periodical drive voltage is applied to a static actuator in the tunable interference filter of the first embodiment.

FIG. 4 is a diagram showing the relationship between the time and the gap distance of the inter-reflecting coating gap G1 when the periodical drive voltage is applied to the static actuator 56 of the tunable interference filter 5.

When the voltage setting section 21 applies the periodical drive voltage to the static actuator 56, the movable section 521 is driven periodically to move toward or away from the fixed substrate 51. As a result, as shown in FIG. 4, the gap distance of the inter-reflecting coating gap G1 continuously changes between an initial gap distance $g_0$ and a minimum gap distance $g_1$ (driving amplitude A).

Here, it is assumed that the range of the gap distance of the inter-reflecting coating gap G1, the gap distance required to extract a light in a wavelength range to be measured, is a gap range (a gap-to-be-measured range Gm) from an upper limit gap distance $g_2$ to a lower limit gap distance $g_3$. Then, the voltage setting section 21 sets the periodical drive voltage in such a way that the driving amplitude A is greater than or equal to the gap-to-be-measured range Gm. That is, the voltage setting section 21 sets the periodical drive voltage in such way that the upper limit gap distance $g_2$ is smaller than or equal to the initial gap distance $g_0$ and the lower limit gap distance $g_3$ is greater than or equal to the minimum gap distance $g_1$.

As a result of such a periodical drive voltage being set, an upper limit margin between the initial gap distance $g_0$ and the upper limit gap distance $g_2$ and a lower limit margin between the lower limit gap distance $g_3$ and the minimum gap distance $g_1$ are provided. By providing the lower limit margin, it is possible to extract reliably a light in a wavelength range to be measured. For example, when a configuration in which the lower limit gap distance $g_3$ and the minimum gap distance $g_1$ in a wavelength range to be measured coincide with each other (a configuration in which no lower limit margin is provided) is adopted, it may become impossible to extract a light of a minimum wavelength in the wavelength range to be measured when the amount of displacement of the movable section 521 becomes small due to the measurement environment or the like. On the other hand, in this embodiment, since the lower limit margin is provided, it is possible to extract a light of a minimum wavelength reliably. Moreover, by providing the upper limit margin, it is possible to reduce the influence of changes in the measurement environment.

Incidentally, in this embodiment, an example in which the upper limit margin and the lower limit margin are provided is described. However, the periodical drive voltage may be set in such a way that any one or both of these margins are not provided.

The voltage monitoring section 22 continuously monitors the voltage which is applied to the static actuator 56 from the voltage controlling section 15 while the spectrophotometer 1 is performing spectrophotometric measurement, for example. The measured voltage obtaining section 23 sets voltages to be measured based on the V-λ data stored in the storing section 30. That is, the measured voltage obtaining section 23 sets wavelengths to be measured at predetermined wavelength intervals (at measurement intervals) in a wavelength range to be measured and reads, from the V-λ data, voltages to be measured corresponding to the wavelengths to be measured. Incidentally, the wavelength range to be measured and the measurement interval may be changed appropriately by the inputting of settings performed by a measurer, for example. In this case, the measured voltage obtaining section 23 sets a wavelength range to be measured in accordance with the inputting of setting and sets wavelengths to be measured at measurement intervals in the set wavelength range to be measured.

The light intensity obtaining section 24 detects a detected signal which is output from the detecting section 11 at time points (for example, time points t1 to t4 in FIG. 4) at which the voltages to be measured obtained by the measured voltage obtaining section 23, are applied to the static actuator 56 and obtains the light intensity of a light of the wavelength to be measured.

Figure 5:
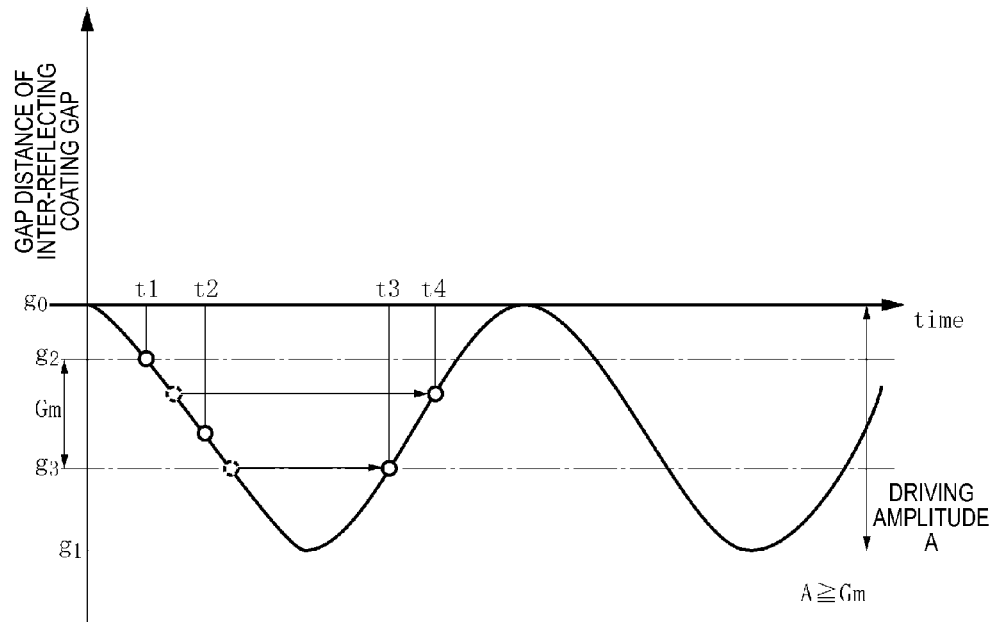
FIG. 5 is a diagram showing the relationship between the time and the gap distance of the inter-reflecting coating gap when a periodical drive voltage is applied to the static actuator in the tunable interference filter of the first embodiment.

Incidentally, in the example shown in FIG. 4, the light intensity obtaining section 24 obtains the light intensities corresponding to the voltages to be measured while the movable section 521 is driven one-quarter of a cycle from an initial state. However, the embodiment is not limited to this example. For example, when the periodic driving speed of the movable section 521 is high, it may be difficult to obtain the light intensities corresponding to a plurality of voltages to be measured while the movable section 521 is driven one-quarter of a cycle from an initial state. In such a case, as shown in FIG. 5, for example, the light intensities corresponding to some voltages to be measured of all the voltages to be measured may be measured while the movable section 521 is driven one-quarter of a cycle from an initial state, and the light intensities corresponding to the remaining voltages to be measured may be measured from one-quarter to one-half of a cycle. Moreover, measurement after one-half of a cycle may be further performed in accordance with the number of set voltages to be measured.

The spectrophotometric measurement section 25 measures the spectrum of the light to be measured based on the light intensity corresponding to each wavelength to be measured obtained by the light intensity obtaining section 24. Moreover, the spectrophotometric measurement section 25 may generate a spectral curve based on the measured spectrum. Then, the spectrophotometric measurement section 25 outputs the measurement result or the spectral curve to an output device such as a display or a printing system.

Spectrophotometric Measurement Method using the Spectrophotometer

Next, a spectrophotometric measurement method using the spectrophotometer 1 described above will be described based on the drawing.

Figure 6:
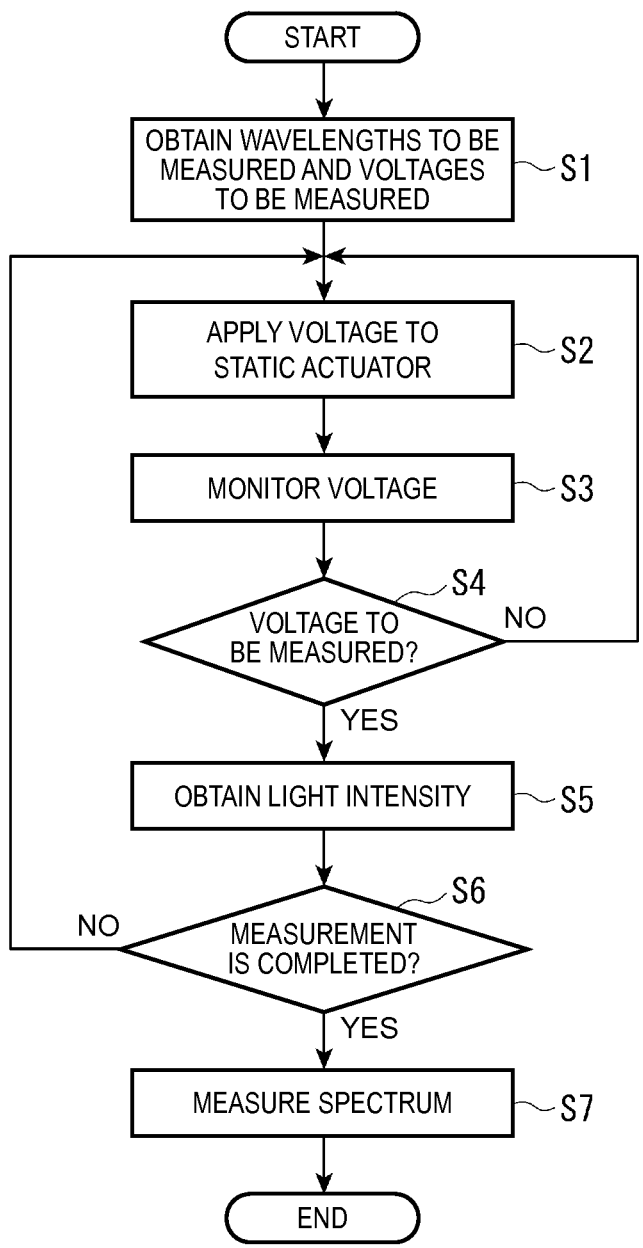
FIG. 6 is a flowchart showing a spectrophotometric measurement method using the spectrophotometer of the first embodiment.

FIG. 6 is a flowchart of the spectrophotometric measurement method of this embodiment.

As shown in FIG. 6, in the spectrophotometric measurement method of this embodiment, when measurement is started, the measured voltage obtaining section 23 first obtains wavelengths to be measured and voltages to be measured corresponding to the wavelengths to be measured (S1). Specifically, for example, when inputting of settings is not performed by the measurer, the measured voltage obtaining section 23 obtains, from the V-λ data stored in the storing section 30, voltages to be measured corresponding to wavelengths to be measured at preset measurement intervals. Moreover, for example, when a wavelength range to be measured or a measurement interval is designated based on the inputting of settings performed by the measurer, the measured voltage obtaining section 23 calculates wavelengths to be measured at designated measurement intervals in the designated wavelength range to be measured and obtains voltages to be measured corresponding to the wavelengths to be measured based on the V-λ data.

Then, the voltage setting section 21 and the voltage controlling section 15 apply a periodical drive voltage to the static actuator 56 of the tunable interference filter 5 (S2). In S2, the voltage setting section 21 sets a continuously-varying periodical drive voltage (alternating voltage) having a longer period than the natural period of the movable section 521 and makes the voltage controlling section 15 apply the periodical drive voltage to the static actuator 56. As a result, the movable section 521 is driven periodically to move toward or away from the fixed substrate 51, and, as shown in FIG. 4 or 5, the gap distance of the inter-reflecting coating gap G1 periodically changes.

Moreover, as soon as the processing in S2 is performed, the voltage monitoring section 22 starts monitoring the voltage applied to the static actuator 56 (S3).

Then, the light intensity obtaining section 24 determines in S3 whether or not the voltage monitored by the voltage monitoring section 22 has become the voltage to be measured set in S1 (S4).

If it is determined in S4 that the voltage monitored by the voltage monitoring section 22 is not the voltage to be measured ("No"), the procedure goes back to the processing in S2 or S3, and application of the periodical drive voltage to the static actuator 56 and voltage monitoring performed by the voltage monitoring section 22 are continuously performed.

On the other hand, if it is determined in S4 that the voltage monitored by the voltage monitoring section 22 has become the voltage to be measured ("Yes"), the light intensity obtaining section 24 measures the light intensity at the wavelength to be measured based on the detected signal which is input from the detecting section 11 (S5).

Moreover, the light intensity obtaining section 24 relates the obtained light intensity to the voltage to be measured (or the gap distance to be measured corresponding to the voltage to be measured or the wavelength to be measured) at the time of measurement of the light intensity and stores them in the storing section 30.

Then, the control circuit section 20 determines whether or not the measurement has completed (S6). In this embodiment, measurement of light intensity is performed once at each wavelength to be measured. Therefore, in S6, the control circuit section 20 determines whether or not the measurement has been completed by determining whether or not the light intensity obtaining section 24 has obtained the light intensities at all the voltages to be measured obtained in S1. If "No" is obtained in S6, that is, if it is determined that the measurement has not been completed, the procedure goes back to the processing in S2 or S3, and application of the periodical drive voltage to the static actuator 56 and voltage monitoring performed by the voltage monitoring section 22 are continuously performed.

On the other hand, if "Yes" is obtained in S6, that is, if it is determined that the measurement has been completed, the voltage setting section 21 and the voltage controlling section 15 stop application of the voltage to the static actuator 56. Then, the spectrophotometric measurement section 25 measures the spectrum of a light to be measured based on the light intensity at each voltage to be measured (each wavelength to be measured) obtained in S5 and stored in the storing section 30 (S7).

Effects of the Embodiment

In the spectrophotometer 1 of this embodiment, the voltage setting section 21 sets, as a voltage which is applied to the static actuator 56, a periodical drive voltage which is a continuously-varying analog voltage and makes the voltage controlling section 15 apply the periodical drive voltage to the static actuator 56. As a result, the movable section 521 of the tunable interference filter 5 continuously changes with respect to the fixed substrate 51, and the gap distance of the inter-reflecting coating gap G1 continuously changes in a gap-to-be-measured range corresponding to a wavelength range to be measured. The light intensity obtaining section 24 obtains a light intensity which is detected by the detecting section 11 when the voltage applied to the static actuator 56 and monitored by the voltage monitoring section 22, has become the voltage to be measured.

In the spectrophotometer 1 with such a configuration, it is possible to obtain promptly the light intensity at the wavelength to be measured by the light intensity obtaining section 24 and perform prompt measurement of the spectrum of a light to be measured in the spectrophotometer 1.

In other words, when a step voltage is applied to the static actuator 56, vibration is generated in the movable section 521, which makes it necessary to wait until the movable section 521 stops vibrating to perform accurate measurement of light intensity. On the other hand, in this embodiment, since the light intensity detected by the detecting section 11 is obtained when the continuously-varying voltage applied to the static actuator 56 has become the voltage to be measured, it is not necessary to provide the above-described waiting time at the time of application of the step voltage and it is possible to obtain the light intensity at the wavelength to be measured immediately.

Moreover, the voltage setting section 21 applies the periodically-varying periodical drive voltage to the static actuator 56 by controlling the voltage controlling section 15.

As a result, the movable section 521 is driven periodically to move toward or away from the fixed substrate 51. That is, the inter-reflecting coating gap displaces in the gap-to-be-measured range once each one-quarter of a cycle. Therefore, for example, even when it is difficult to obtain the light intensities at the voltages to be measured in one-quarter of a cycle, it is possible to obtain the light intensity at the voltage to be measured that could not be obtained, in the next or later one-quarter of a cycle. This makes it possible to obtain the light intensities at all the set voltages to be measured and perform accurate measurement of spectrum by the spectrophotometric measurement section 25. In this embodiment, the drive period of the periodical drive voltage set by the voltage setting section 21 is set at a value that is greater than the natural period of the movable section 521.

As a result, when the periodical drive voltage is applied to the static actuator 56, the forward and backward movement of the movable section 521 is not affected by vibration excitation based on the natural period of the movable section 521. Moreover, a vibration component (for example, vibration based on the natural period) other than the vibration of the movable section 521 based on the periodical drive voltage is easily removed as a noise component by a low-pass filter, for example. This makes it possible to perform more accurate measurement of light intensity at a predetermined voltage to be measured and improve the accuracy of measurement of spectrum.

In this embodiment, the voltage setting section 21 sets the periodical drive voltage in such a way that a lower limit margin and an upper limit margin are set in lower and upper portions of the gap-to-be-measured range of the inter-reflecting coating gap G1, for the wavelength range to be measured of a light to be measured. This makes it possible to circumvent a situation in which the light intensity in a wavelength range to be measured cannot be obtained due to, for example, changes in the measurement environment and perform highly accurate measurement of spectrum.

In this embodiment, the V-$\lambda$ data is stored in the storing section 30, and the measured voltage obtaining section 23 obtains a voltage to be measured based on the V-$\lambda$ data. This makes it possible to set easily a voltage to be measured corresponding to an intended wavelength to be measured.

Second Embodiment

Next, a second embodiment according to the invention will be described based on the drawing.

In the spectrophotometer of the first embodiment described above, as shown in FIGS. 4 and 5, the light intensity obtaining section 24 obtains a light intensity once at each set voltage to be measured. On the other hand, a spectrophotometer of the second embodiment differs from the spectrophotometer of the first embodiment described above in that a plurality of light intensities are obtained at each voltage to be measured. Incidentally, since the component elements forming the spectrophotometer of the second embodiment are the same as those of the first embodiment described above, their descriptions will be omitted.

Figure 7:
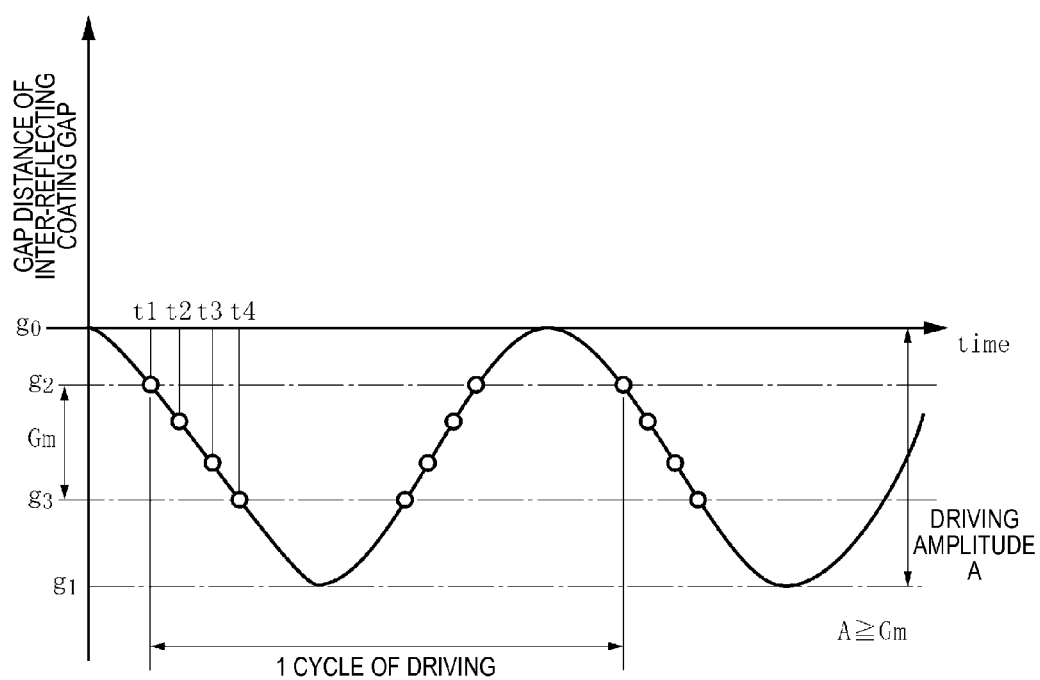
FIG. 7 is a diagram showing the relationship between the time and the gap distance of an inter-reflecting coating gap when a periodical drive voltage is applied to a static actuator in a tunable interference filter of a second embodiment.

FIG. 7 is a diagram showing the relationship between the time and the inter-reflecting coating gap G1 when a periodical drive voltage is applied to the tunable interference filter 5 in the second embodiment.

As shown in FIG. 7, the light intensity obtaining section 24 of this embodiment obtains the light intensity at least two times at each voltage to be measured which is obtained by the measured voltage obtaining section 23.

Then, the light intensity obtaining section 24 calculates an average value from the plurality of light intensities obtained at each voltage to be measured and uses the average value as a measurement value for the voltage to be measured.

In this embodiment, since the measurement value of the light intensity of a light of a wavelength to be measured is obtained based on the average value of the obtained light intensities, it is possible to obtain a more accurate measurement result.

Third Embodiment

Next, a third embodiment according to the invention will be described based on the drawing.

In the first and second embodiments described above, the measured voltage obtaining section 23 obtains a voltage to be measured based on the V-$\lambda$ data stored in the storing section 30. On the other hand, a spectrophotometer of this embodiment differs from the spectrophotometers of the first and second embodiments described above in that a gap distance detecting section detecting the gap distance of the inter-reflecting coating gap G1 is provided in the tunable interference filter and a voltage to be measured is obtained based on the gap distance detecting section.

Figure 8:
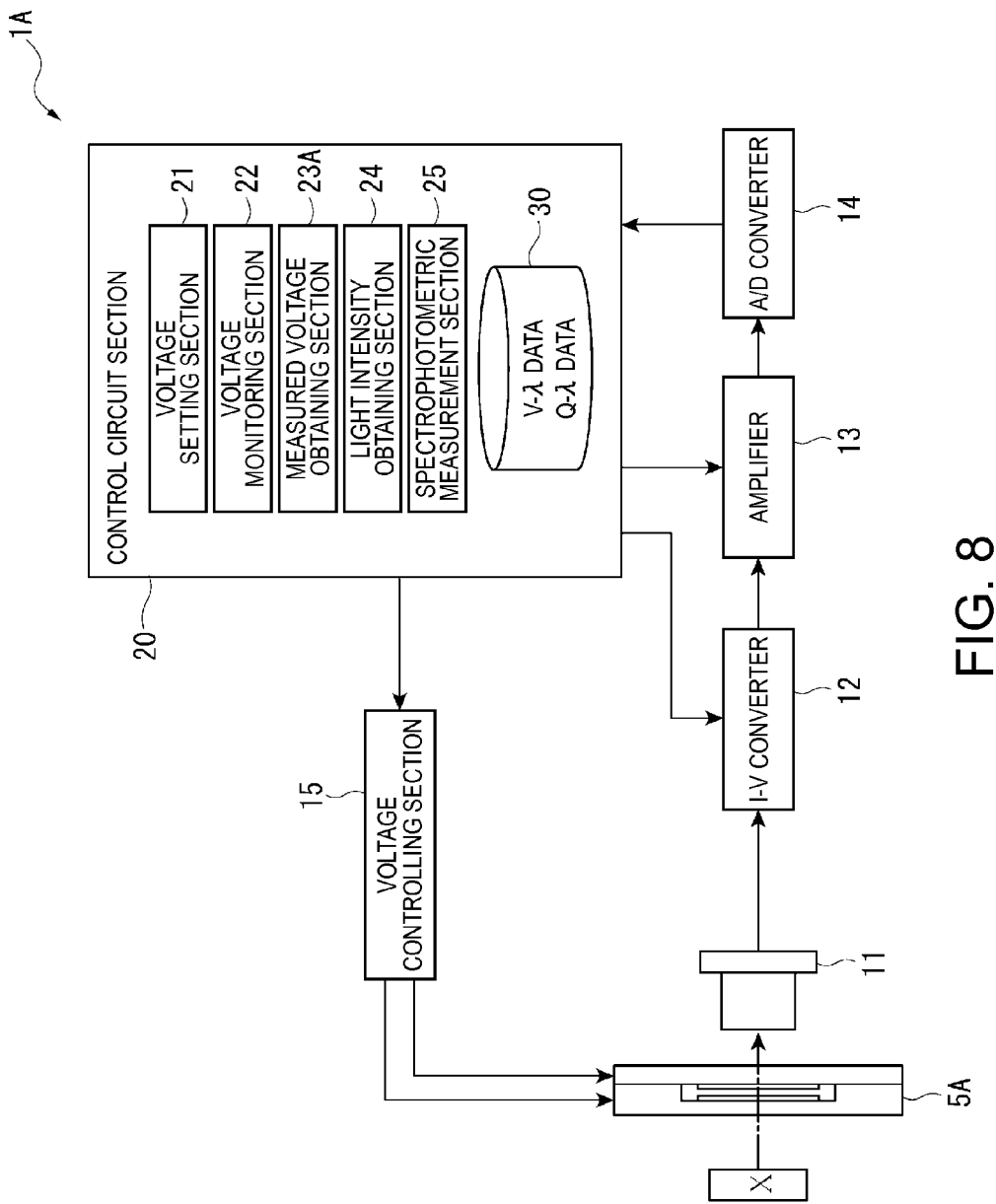
FIG. 8 is a block diagram showing a schematic configuration of a spectrophotometer of a third embodiment.
Figure 9:
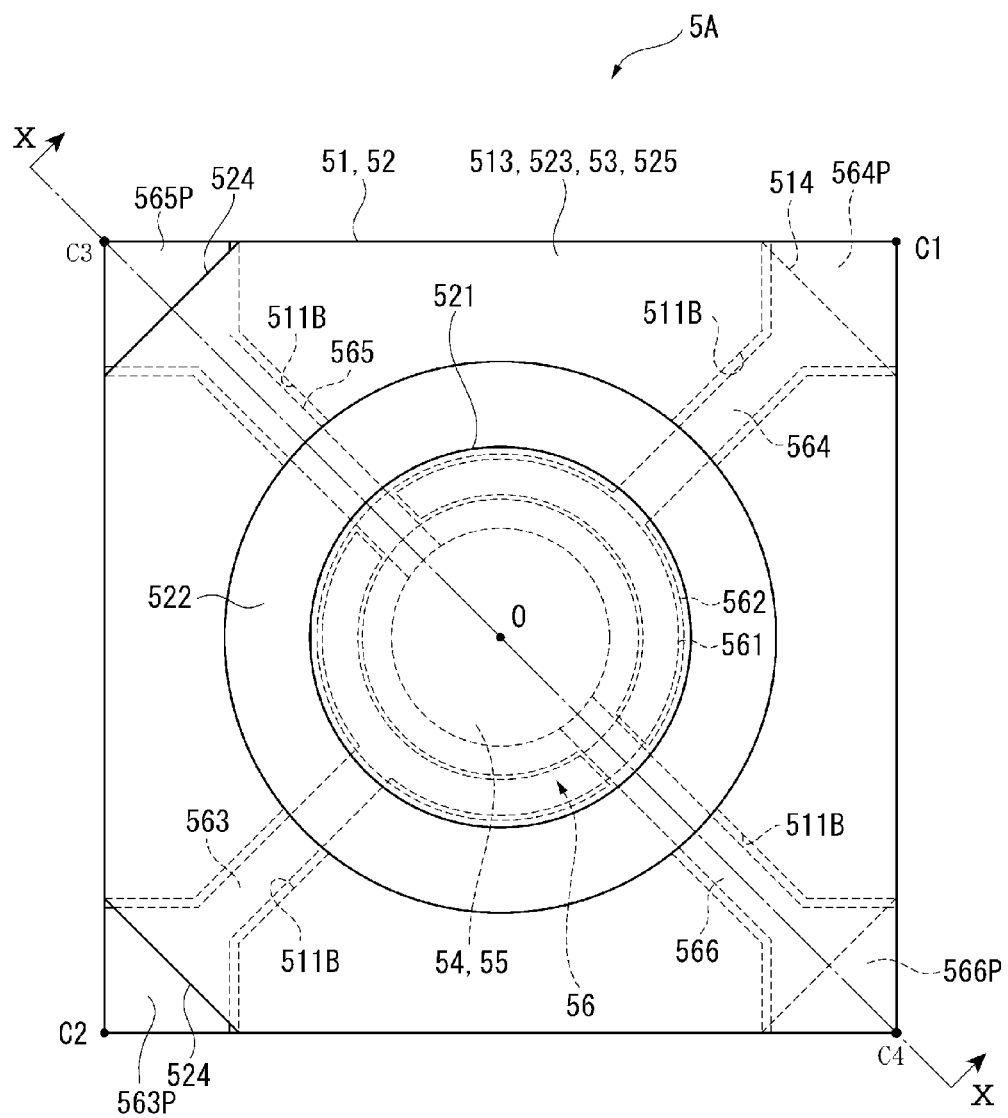
FIG. 9 is a plan view showing a schematic configuration of a tunable interference filter of the third embodiment.
Figure 10:
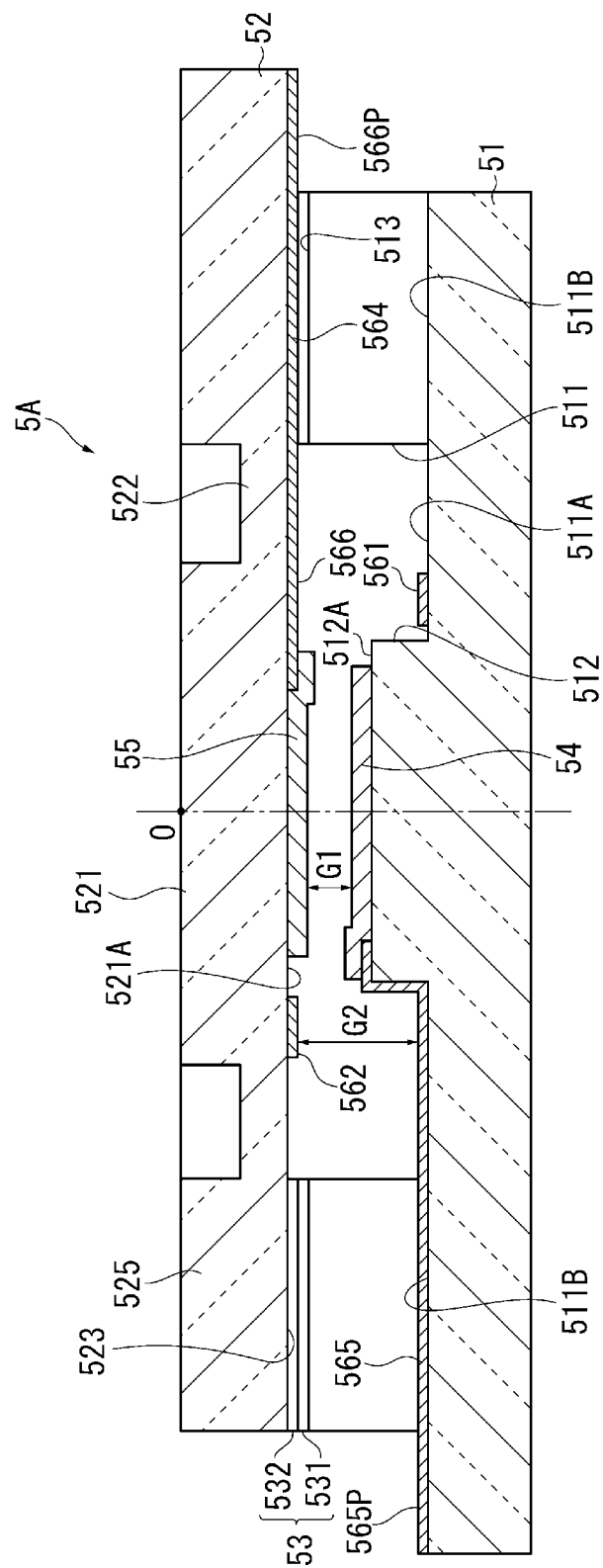
FIG. 10 is a sectional view of the tunable interference filter taken on the line X-X of FIG. 9.

FIG. 8 is a block diagram showing a schematic configuration of the spectrophotometer of the third embodiment. Moreover, FIG. 9 is a plan view showing a schematic configuration of a tunable interference filter of the third embodiment, and FIG. 10 is a sectional view of the tunable interference filter. In a tunable interference filter 5A of this embodiment, as shown in FIGS. 9 and 10, a fixed-side capacitive detection electrode 565 is connected to a fixed reflecting coating 54, and a movable-side capacitive detection electrode 566 is connected to a movable reflecting coating 55. Here, the capacitive detection electrodes 565 and 566 form a gap distance detecting section according to the invention.

Here, when the fixed reflecting coating 54 and the movable reflecting coating 55 are formed of a metal film or a metal alloy film, the capacitive detection electrodes 565 and 566 simply have to be connected to the outer peripheries of the reflecting coatings 54 and 55, respectively. Moreover, when the fixed reflecting coating 54 and the movable reflecting coating 55 are formed of a nonconductive material such as a dielectric multilayer film, it is necessary simply to form, for example, a metal thin film on the surfaces of the reflecting coatings and connect the capacitive detection electrodes 565 and 566 to the metal thin films.

Moreover, in this embodiment, as shown in FIG. 9, a fixed electrode 561 is formed, for example, in the shape of the letter C in which an opening is formed in part thereof in the direction of a vertex C3, and a movable electrode 562 is formed, for example, in the shape of the letter C in which an opening is formed in part thereof in the direction of a vertex C4.

In addition, the fixed-side capacitive detection electrode 565 is provided in such a way as to extend from the outer periphery of the fixed reflecting coating 54 in the direction of the vertex C3 after passing through an opening of the C-shaped fixed electrode 561. An end section (a portion located at the vertex C3) of the fixed-side capacitive detection electrode 565 forms a fixed-side detection electrode pad 565P connected to a voltage controlling section 15.

Similarly, the movable-side capacitive detection electrode 566 is provided in such a way as to extend from the outer periphery of the movable reflecting coating 55 in the direction of the vertex C4 after passing through an opening of the C-shaped movable electrode 562. An end section (a portion located at the vertex C4) of the movable-side capacitive detection electrode 566 forms a movable-side detection electrode pad 566P connected to the voltage controlling section 15.

As shown in FIG. 8, in a spectrophotometer 1A of this embodiment, a control circuit section 20 includes a voltage setting section 21, a voltage monitoring section 22, a measured voltage obtaining section 23A, a light intensity obtaining section 24, a spectrophotometric measurement section 25, and a storing section 30.

The measured voltage obtaining section 23A controls the voltage controlling section 15 so that the voltage controlling section 15 applies an extremely low voltage between the fixed-side capacitive detection electrode 565 and the movable-side capacitive detection electrode 566, and makes the capacitive detection electrodes 565 and 566 retain charges. In addition, the measured voltage obtaining section 23A detects the retaining amount of the charges retained in the capacitive detection electrodes 565 and 566 when the voltage setting section 21 and the voltage controlling section 15 displace the gap distance of the inter-reflecting coating gap G1, and calculates the gap distance of the inter-reflecting coating gap G1 based on the detected charge retaining amount. Moreover, based on the voltage monitored by the voltage monitoring section 22, the measured voltage obtaining section 23A obtains the voltage as a voltage to be measured when the detected gap distance becomes a predetermined gap distance to be measured. That is, the measured voltage obtaining section 23A forms a voltage obtaining section according to the invention.

Spectrophotometric Measurement Method using the Spectrophotometer

In a spectrophotometric measurement method of this embodiment, in place of S1 of the first embodiment described above, the measured voltage obtaining section 23A obtains a wavelength to be measured and a voltage to be measured at the wavelength to be measured.

Specifically, the measured voltage obtaining section 23A first applies a predetermined extremely low capacitive detection voltage between the capacitive detection electrodes 565 and 566 to make the capacitive detection electrodes 565 and 566 retain charges.

Then, the voltage setting section 21 controls the voltage controlling section 15 so that the voltage controlling section 15 applies a periodical drive voltage to a static actuator 56. As a result, the movable section 521 is driven periodically and the gap distance of the inter-reflecting coating gap G1 changes. Moreover, at this time, the voltage monitoring section 22 monitors the voltage applied to the static actuator 56.

Then, the measured voltage obtaining section 23A detects the amount of charge retained in the capacitive detection electrodes 565 and 566, and, when the detected charge amount becomes a charge amount corresponding to the gap distance to be measured, the measured voltage obtaining section 23A obtains the voltage monitored by the voltage monitoring section 22 as a voltage to be measured. Here, the charge amount corresponding to the gap distance to be measured simply has to be measured in advance at the time of production of the tunable interference filter 5A, for example, and stored in the storing section 30 as data (Q-$\lambda$ data) on the amount of charge retained in the capacitive detection electrodes 565 and 566 at a wavelength to be measured $\lambda$.

Furthermore, as detection intervals at which the amount of charge retained in the capacitive detection electrodes 565 and 566 are detected when a voltage to be measured is obtained, a value corresponding to preset measurement intervals may be used or, for example, a value corresponding to measurement intervals set and input by the measurer may be used.

Thereafter, as is the case with the first embodiment described above, the spectrophotometer 1A performs the processing from S2 to S7, obtains a light intensity at the set voltage to be measured, and measures the spectrum of a light to be measured.

Effects of the Embodiment

In the spectrophotometer 1A of this embodiment, the tunable interference filter 5A has the fixed-side capacitive detection electrode 565 and the movable-side capacitive detection electrode 566. In addition, the measured voltage obtaining section 23A detects the gap distance of the inter-reflecting coating gap G1 based on the amount of charge retained in the capacitive detection electrodes 565 and 566. Then, the measured voltage obtaining section 23A obtains, as a voltage to be measured, the voltage monitored by the voltage monitoring section when the gap distance becomes a predetermined gap distance to be measured.

In such a configuration, even when the gap distance of the inter-reflecting coating gap G1, corresponding to the voltage applied to the static actuator 56, changes due to changes in the measurement environment, for example, it is possible to obtain an accurate voltage to be measured corresponding to a gap distance to be measured. Therefore, by performing measurement of light intensity based on the voltage to be measured which is obtained in this manner, it is possible to measure a more accurate light intensity at a wavelength to be measured and measure the spectrum of a light to be measured with higher accuracy.

Modified Examples

It is to be understood that the invention is not limited in any way to the embodiments thereof described above, and, unless modifications and improvements depart from the scope of the invention, they should be construed as being included therein. In the embodiments described above, the static actuator 56 is described as an example of the gap distance changing section that changes the gap distance of the inter-reflecting coating gap G1. However, the gap distance changing section is not limited to the static actuator 56.

For example, a configuration using a dielectric actuator having a first dielectric coil which is disposed in place of the fixed electrode 561 and a second dielectric coil or a permanent magnet which is disposed in place of the movable electrode 562 may be adopted.

Furthermore, a configuration using a piezoelectric actuator in place of the static actuator 56 may be adopted. In this case, by stacking a lower electrode layer, a piezoelectric film, and an upper electrode layer on the holding section 522, for example, and varying, as an input value, a voltage which is applied between the lower electrode layer and the upper electrode layer, it is possible to make the piezoelectric film expand and contract, and to bend the holding section 522.

The voltage setting section 21 controls the voltage controlling section 15 so that the voltage controlling section 15 applies a periodical drive voltage to the static actuator 56. However, the voltage setting section 21 may control the voltage controlling section 15 so that, for example, the voltage controlling section 15 applies an analog voltage (for example, a voltage corresponding to one-quarter of a cycle of the periodical drive voltage of the first embodiment described above) which continuously increases from an initial state to a predetermined maximum voltage.

The voltage setting section 21 sets the periodical drive voltage having a longer period than the natural period of the movable section 521. However, the invention is not limited to this example. The voltage setting section 21 may set a periodical drive voltage having the same period as the natural period of the movable section 521 or a periodical drive voltage having a shorter period than the natural period of the movable section 521.

Specific configurations of the invention, adopted when the invention is carried out, can be appropriately changed to other configurations etc. within the scope of the invention. The entire disclosure of Japanese Patent Application No. 2011-235357, filed Oct. 26, 2011, is expressly incorporated by reference herein.

What is claimed is:

1. A spectrophotometer comprising:
a first substrate;
a second substrate facing the first substrate;
a first reflecting film provided on the first substrate;
a second reflecting film provided on the second substrate and facing the first reflecting film with a gap between the second reflecting film and the first reflecting film;
a gap distance changing section changing a gap distance of the gap by bending the second substrate by application of an analog voltage;
a measured voltage obtaining section obtaining a measurement target voltage;
a detecting section detecting light intensity of a light extracted after passing through the first reflecting film and the second reflecting film;
a filter driving section applying the analog voltage, which continuously varies, to the gap distance changing section;
a voltage monitoring section monitoring the analog voltage applied to the gap distance changing section; and
a light intensity obtaining section obtaining the light intensity detected by the detecting section when the analog voltage monitored by the voltage monitoring section becomes the measurement target voltage.

2. The spectrophotometer according to claim 1, wherein the filter driving section applies, to the gap distance changing section, the analog voltage periodically driving the second substrate to move toward or away from the first substrate.

3. The spectrophotometer according to claim 2, wherein a period for applying the periodical drive voltage is longer than a natural period of the second substrate.

4. The spectrophotometer according to claim 2, wherein the light intensities obtaining section obtains a plurality of light intensities corresponding to the measurement target voltage and uses an average value of the plurality of light intensities as a measurement value.

5. The spectrophotometer according to claim 1, wherein the filter driving section changes the gap distance from an initial gap distance at which the second substrate does not bend to a predetermined minimum gap distance, and the predetermined minimum gap distance is smaller than a lower limit gap distance corresponding to a minimum wavelength in a measurement target wavelength range.

6. The spectrophotometer according to claim 2, wherein the filter driving section changes the gap distance from an initial gap distance at which the second substrate does not bend to a predetermined minimum gap distance, and the predetermined minimum gap distance is smaller than a lower limit gap distance corresponding to a minimum wavelength in a measurement target wavelength range.

7. The spectrophotometer according to claim 3, wherein the filter driving section changes the gap distance from an initial gap distance at which the second substrate does not bend to a predetermined minimum gap distance, and the predetermined minimum gap distance is smaller than a lower limit gap distance corresponding to a minimum wavelength in a measurement target wavelength range.

8. The spectrophotometer according to claim 1, further comprising:
a storing section storing V-$\lambda$ data indicating a relationship between a wavelength of the light extracted after passing through the first reflecting film and the second reflecting film and a corresponding value of the analog voltage applied to the gap distance changing section,
wherein
the measurement target voltage is obtained from the V-$\lambda$ data and by selecting the measurement target voltage that corresponds to a measurement target wavelength.

9. The spectrophotometer according to claim 2, further comprising:
a storing section storing V-λ data indicating a relationship between a wavelength of the light extracted after passing through the first reflecting film and the second reflecting film and a corresponding value of the analog voltage applied to the gap distance changing section,
wherein
the measurement target voltage is obtained from the V-λ data and by selecting the measurement target voltage that corresponds to a measurement target wavelength.

10. The spectrophotometer according to claim 3, further comprising:
a storing section storing V-λ data indicating a relationship between a wavelength of the light extracted after passing through the first reflecting film and the second reflecting film and a corresponding value of the analog voltage applied to the gap distance changing section,
wherein
the measurement target voltage is obtained from the V-λ data and by selecting the measurement target voltage that corresponds to a measurement target wavelength.

11. The spectrophotometer according to claim 1, further comprising:
a gap distance detecting section measuring the gap distance, wherein
the measured voltage obtaining section obtains the measurement target voltage when the gap distance becomes a measurement target gap distance that corresponds to a measurement target wavelength.

12. The spectrophotometer according to claim 2, further comprising:
a gap distance detecting section measuring the gap distance, wherein
the measured voltage obtaining section obtains the measurement target voltage when the gap distance becomes a measurement target gap distance that corresponds to a measurement target wavelength.

13. The spectrophotometer according to claim 3, further comprising:
a gap distance detecting section measuring the gap distance, wherein
the measured voltage obtaining section obtains the measurement target voltage when the gap distance becomes a measurement target gap distance that corresponds to a measurement target wavelength.

14. A spectrophotometer comprising:
a first reflecting film;
a second reflecting film facing the first reflecting film with a gap between the second reflecting film and the first reflecting film;
a gap distance changing section changing a gap distance of the gap by application of an analog voltage;
a measured voltage obtaining section obtaining a measurement target voltage;
a detecting section detecting light intensity of a light extracted after passing through the first reflecting film and the second reflecting film;
a filter driving section applying the analog voltage, which continuously varies, to the gap distance changing section;
a voltage monitoring section monitoring the analog voltage applied to the gap distance changing section; and
a light intensity obtaining section obtaining the light intensity detected by the detecting section when the analog voltage monitored by the voltage monitoring section becomes the measurement target voltage.

15. The spectrophotometer according to claim 1, wherein the measured voltage obtaining section obtains the measurement target voltage by setting a value for the measurement target voltage.

16. The spectrophotometer according to claim 14, wherein the measured voltage obtaining section obtains the measurement target voltage by setting a value for the measurement target voltage.

* * * * *